United States Patent
Hayden et al.

[11] Patent Number: 5,900,050
[45] Date of Patent: May 4, 1999

[54] METHOD FOR CONDITIONING ORGANIC PIGMENTS

[75] Inventors: Michael D. Hayden, Goose Creek; Charles W. Sandefur, Summerville; Abdul Sattar, Mt. Pleasant; Charles E. Shannon, Summerville; Brian L. Thompson, Goose Creek, all of S.C.

[73] Assignee: Bayer Corporation, Pittsburgh, Pa.

[21] Appl. No.: 08/953,602

[22] Filed: Oct. 17, 1997

[51] Int. Cl.$^6$ ........................................ C08K 5/16
[52] U.S. Cl. ................ 106/493; 106/412; 106/413; 106/494; 106/495; 106/497; 106/498; 106/499; 106/503; 106/504; 106/506; 106/31.75
[58] Field of Search ................... 106/410, 412, 106/413, 493, 494, 495, 497, 498, 499, 503, 504, 506, 31.75

[56] References Cited

U.S. PATENT DOCUMENTS

| | | | |
|---|---|---|---|
| 2,268,144 | 12/1941 | Vesce | 106/309 |
| 4,929,279 | 5/1990 | Hays | 106/412 |
| 5,662,739 | 9/1997 | Urban et al. | 106/497 |
| 5,728,206 | 3/1998 | Badejo | 106/493 |

FOREIGN PATENT DOCUMENTS 758004  2/1997  European Pat. Off. .

OTHER PUBLICATIONS

K. Merkle & H. Schäfer "Surface Treatment of Organic Pigments" in Pigments Handbook, vol. III (NY: John Wiley & Sons Inc., 1973) month unavailable pp. 157–167.

R.B. McKay, "The Development of Organic Pigments with Particular Reference to Physical Form and Consequent Behaviour in Use" in Rev. Prog. Coloration, 10, 25–32 (month unavailable) 1979.

R.B. McKay, "Control of the application performance of classical organic pigments" in JOCCA, 89–93, (month unavailable) 1989.

W. Herbst and K. Hunger, Industrial Organic Pigments (NY: VCH Publishers, Inc., 1993), month unavailable, pp. 205–207.

*Primary Examiner*—Anthony Green
*Attorney, Agent, or Firm*—Joseph C. Gil; Richard E.L. Henderson

[57] ABSTRACT

This invention relates to a process for preparing pigment compositions by conditioning an organic pigment, at about 50 to about 200° C., with (1) at least about 0.1% by weight, relative to the organic pigment, of one or more surfactants of formula (I) and/or formula (II)

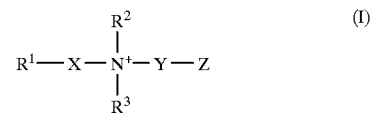

and/or

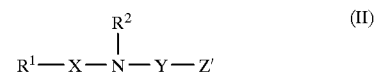

wherein $R^1$, $R^2$, $R^3$, X, Y, Z, and Z' are defined herein; and (2) about 1 to about 100 parts by weight, per part by weight of the organic pigment, of a liquid in which the organic pigment is substantially insoluble.

19 Claims, No Drawings

METHOD FOR CONDITIONING ORGANIC PIGMENTS

BACKGROUND OF THE INVENTION

This invention relates to a process for preparing pigment compositions having improved dispersibility in plastics and other macromolecular materials by conditioning organic pigments with non-solvents containing certain surfactants.

Organic pigments in the form initially obtained after chemical synthesis, often referred to as crude pigments, are generally unsuitable for use as pigments and must be subjected to one or more additional finishing steps that modify particle size, particle shape, and/or crystal structure in such a way that provides good pigmentary quality. See, for example, K. Merkle and H. Schäfer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989).

The most commonly used conditioning methods involve dissolving or suspending the crude pigment in strong mineral acids, followed by precipitation, and/or milling the crude pigment. Conditioning with a strong acid involves treating the crude pigment with aqueous mineral acid such as sulfuric acid in a process known as "acid pasting" (in which an acidic solution containing protonated pigment is formed) or "acid swelling" (in which a suspension of protonated pigment is formed). After the acid treatment is completed, the pigment is precipitated by adding the strongly acidic solution to a liquid in which the pigments are completely or almost completely insoluble, such as water or methanol or other lower aliphatic alcohols, as well as mixtures thereof.

Further treatment of conditioned organic pigments is sometimes desirable or necessary, particularly when the pigments are to be dispersed in plastics. Surface treatment is a type of finishing in which certain auxiliaries, such as rosin or other resins, are applied to pigments to influence their surface structure and thus their physical and coloristic properties. E.g., W. Herbst and K. Hunger, *Industrial Organic Pigments* (New York: VCH Publishers, Inc., 1993), pages 205–207. For example, treatment of organic pigments with emulsions of certain dispersing agents such as sulfonated dicarboxylic acids in non-aqueous volatile oils such as naphtha can improve the dispersibility of the pigments in non-aqueous vehicles used for inks, paints, and varnishes. E.g., U.S. Pat. No. 2,268,144. The elimination of such additional steps would be advantageous if desirable pigmentary properties could be maintained.

U.S. Pat. No. 5,662,739 describes a method for improving the dispersibility of quinacridone and dioxazine pigments by using certain fatty acid taurides. The fatty acid taurides, however, are amides rather than ammonium or amine compounds such as used in the present invention.

European Patent Application 758,004 describes a method for improving the dispersibility for a specific pigment, Pigment Yellow 12, by carrying out the preparative coupling reaction in the presence of certain cationic and amine oxide surfactants. The European application, however, does not mention other types of pigments and does not suggest that pigments could be conditioned in the presence of such surfactants.

An object of the present invention was reducing or eliminating the use of strong acids and eliminating further surface treatment steps while at the same time providing organic pigments that can be easily dispersed in plastics. These and other objects have been achieved by conditioning organic pigments with non-solvents containing specific types of nitrogen-containing surfactants.

SUMMARY OF THE INVENTION

This invention relates to a process for preparing pigment compositions comprising (a) conditioning an organic pigment, at a temperature of about 50 to about 200° C., with
  (1) at least about 0.1% by weight (preferably 0.1 to 100% by weight, more preferably 2 to 15% by weight), relative to the organic pigment, of one or more surfactants comprising
    (i) an ionic surfactant of formula (I)

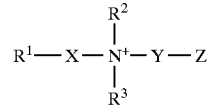

wherein
  $R^1$ is $C_8$–$C_{30}$ aliphatic or modified $C_8$–$C_{30}$ aliphatic in which at least one carbon atom in the main chain is replaced with —O—, —S—, —CONH—, —NHCO—, —CH=CH—, —OSi($C_1$–$C_4$ alkyl)$_2$-, or optionally substituted $C_5$–$C_7$ cycloalkylene,
  $R^2$ is hydrogen, $C_1$–$C_6$ alkyl, or —Y—Z',
  $R^3$ is hydrogen or $C_1$–$C_6$ alkyl, or $R^2$ and $R^3$ together are $C_4$–$C_7$ alkylene (thereby forming a five- to eight-membered heterocycle),
  X is a direct bond or —NHC(=NH)—, or X and $R^2$ taken together with the $N^+$ of formula (I) form a five- to seven-membered heterocyclic ring (preferably where $R^2$ and $R^3$ together are not $C_4$–$C_7$ alkylene and thus do not form another ring),
  Y is difunctional $C_1$–$C_8$ (cyclo)aliphatic (preferably $C_1$–$C_6$ alkylene),
  Z is —COO—, —$SO_3^-$, —$PO_3^=$·1/n $M^{n+}$ (wherein $M^{n+}$ is a hydrogen ion or an n-valent cation), or OH, with the proviso that if Z is OH, then an anionic counterion must be present, and
  Z' is —COO$^-$·1/n $M^{n+}$, —$SO_3^-$·1/n $M^{n+}$, or —$PO_3^=$·2/n $M^{n+}$ (wherein $M^{n+}$ is a hydrogen ion and/or an n-valent cation) or OH, with the proviso that Z' must be OH if Z is OH;
    (ii) a surfactant of formula (II)

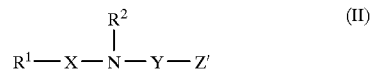

wherein
  $R^1$ is $C_8$–$C_{30}$ aliphatic or modified $C_8$–$C_{30}$ aliphatic in which at least one carbon atom in the main chain is replaced with —O—, —S—, —CONH—, —NHCO—, —CH=CH—, —OSi($C_1$–$C_4$ alkyl)$_2$-, or optionally substituted $C_5$–$C_7$ cycloalkylene,
  $R^2$ is hydrogen, $C_1$–$C_6$ alkyl, or —Y—Z',
  X is a direct bond or —NHC(=NH)—, or X and $R^2$ taken together with the N of formula (II) form a five- to seven-membered heterocyclic ring, Y is difunctional $C_1$–$C_8$ (cyclo)aliphatic (preferably $C_1$–$C_6$ alkylene), and Z' is —COO$^-$·1/n M$^{n+}$, —SO$_3^-$·1/n M$^{n+}$, or —PO$_3^=$·2/n M$^{n+}$ (wherein M$^{n+}$ is a hydrogen ion and/or an n-valent cation) or OH; or (iii) mixtures thereof; and (2) about 1 to about 100 parts by weight (preferably 4 to 15 parts by weight), per part by weight of the organic pigment, of a liquid in which the organic pigment is substantially insoluble, thereby forming a suspension of the conditioned organic pigment in the liquid;

(b) optionally, surface treating the conditioned organic pigment; and (c) collecting the conditioned organic pigment.

This invention further relates to pigment compositions prepared by the process of this invention and to the use of such pigment compositions in the pigmentation of macromolecular substances, coatings, and inks.

DETAILED DESCRIPTION OF THE INVENTION

Suitable organic pigments that can be conditioned according to the process of the present invention include perylene, phthalocyanine, indanthrone, isoindoline, and quinacridone pigments, as well as other known organic pigments. Mixtures, including solid solutions, of such pigments are also suitable.

Peryienes, particularly the diimides and dianhydrides of perylene-3,4,9,10-tetracarboxylic acid, are particularly suitable organic pigments. Suitable perylene pigments can be unsubstituted or substituted, for example, with one or more alkyl, alkoxy, halogens such as chlorine, or other substituents typical of perylene pigments, including those substituted at imide nitrogen atoms with chemically reasonable groups such as alkyl. Crude perylenes can be prepared by methods known in the art. E.g., W. Herbst and K. Hunger, *Industrial Organic Pigments* (New York: VCH Publishers, Inc., 1993), pages 9 and 467–475, H. Zollinger, *Color Chemistry* (VCH Verlagsgessellschaft, 1991), pages 227–228 and 297–298, and M. A. Perkins, "Pyridines and Pyridones" in *The Chemistry of Synthetic Dyes and Pigments*, ed. H. A. Lubs (Malabar, Florida: Robert E. Krieger Publishing Company, 1955), pages 481–482.

Phthalocyanine pigments, especially metal phthalocyanines, are also suitable organic pigments. Although copper phthalocyanines are preferred, other metal-containing phthalocyanine pigments, such as those based on zinc, cobalt, iron, nickel, and other such metals, may also be used. Metal-free phthalocyanines are also suitable but are generally less preferred. Phthalocyanine pigments can be unsubstituted or partially substituted, for example, with one or more alkyl, alkoxy, halogens such as chlorine, or other substituents typical of phthalocyanine pigments. Crude phthalocyanines can be prepared by any of several methods known in the art but are preferably prepared by a reaction of phthalic anhydride, phthalonitrile or derivatives thereof with a metal donor, a nitrogen donor (such as urea or the phthalonitrile itself, and an optional catalyst, preferably in an organic solvent. E.g., W. Herbst and K. Hunger, *Industrial Orqanic Pigments* (New York: VCH Publishers, Inc., 1993), pages 418–427, H. Zollinger, *Color Chemistry* (VCH Verlagsgessellschaft, 1991), pages 101–104, and N. M. Bigelow and M. A. Perkins, "Phthalocyanine Pigments" in *The Chemistry of Synthetic Dyes and Pigments*, ed. H. A. Lubs (Malabar, Florida: Robert E. Krieger Publishing Company, 1955), pages 584–587; see also U.S. Pat. Nos. 4,158,572, 4,257,951, and 5,175,282 and British Patent 1,502,884.

Suitable pigments also include indanthrone pigments prepared by methods known in the art. E.g., W. Herbst and K. Hunger, *Industrial Organic Pigments* (New York: VCH Publishers, Inc., 1993), pages 498–500; H. Zollinger, *Color Chemistry* (VCH Verlagsgessellschaft, 1991), pages 219–220 (see also page 237); and M. S. Whelen, "Anthraquinoneazines" in *The Chemistry of Synthetic Dyes and Pigments*, ed. H. A. Lubs (Malabar, Florida: Robert E. Krieger Publishing Company, 1955), pages 512–522. Indanthrone pigments can be unsubstituted or partially substituted, for example, with one or more alkyl, alkoxy, halogens such as chlorine, or other substituents typical of indanthrone pigments. Underivatized indanthrone (Pigment Blue 60 or, alternatively, Vat Blue 4) is particularly preferred.

Isoindoline pigments, which can optionally be symmetrically or unsymmetrically substituted, are also suitable organic pigments and can be prepared by methods known in the art. E.g., W. Herbst and K. Hunger, *Industrial Organic Pigments* (New York: VCH Publishers, Inc., 1993), pages 398–415. A particularly preferred isoindoline pigment, Pigment Yellow 139, is a symmetrical adduct of iminoisoindoline and barbituric acid precursors.

Quinacridone pigments are also suitable organic pigments. Quinacridones (which, as used herein, includes unsubstituted quinacridone, quinacridone derivatives, and solid solutions thereof) can be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in *Chemical Review*, 67, 1–18 (1967), and U.S. Pat. Nos. 3,157,659, 3,256,285, 3,257,405, and 3,317,539. Suitable quinacridone pigments can be unsubstituted or substituted (for example, with one or more alkyl, alkoxy, halogens such as chlorine, or other substituents typical of quinacridone pigments).

Other suitable organic pigments include dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, and azo compounds, as well as substituted derivatives thereof.

The process of the present invention is suitable for conditioning crude organic pigments but it is also possible to use this process to improve the dispersibility of pigments already conditioned using other conditioning methods.

An organic pigment is first mixed in step (a) with surfactant (1) in the non-solvent liquid (2). Suitable surfactants are ionic surfactants of formula (I)

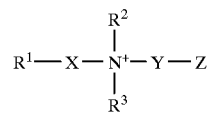

in which $R^1$, $R^2$, $R^3$, X, Y, and Z are defined as above, and ionic or nonionic surfactants of formula (II)

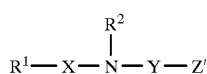

in which $R^1$, $R^2$, $R^3$, X, Y, and Z' are defined as above. Internal salts of formula (I) in which at least one of $R^2$ or $R^3$ is hydrogen and Z is an anionic group and compounds of formula (II) in which Z' represents —COOH, —SO$_3$H, or —PO$_3$H·1/n M$^{n+}$ (where M$^{n+}$ is H$^+$or an n-valent cation) can represent different ionic forms of the same compound. (In fact, the two forms may be in equilibrium.) One skilled in the art would readily understand this aspect of the representation and, if necessary, could determine which form would actually be present. For the purposes of this disclosure, the distinction is not critical.

The term "$C_8$–$C_{30}$ aliphatic" as used herein with respect to the descriptions of surfactants (1) refers to straight or branched chain aliphatic hydrocarbon groups having from 8 to 30 carbon atoms that can optionally be modified by replacing one or more carbon atoms in the main chain with —O—, —S—, —CONH—, —NHCO—, —CH=CH—, —OSi(alkyl)$_2$-, or $C_5$-$C_7$ cycloalkylene in a chemically reasonable manner. When two or more such groups are present, they must, of course, also be present in chemically reasonable combinations. For example, heteroatoms are preferably not located adjacent to each other or, when X is a direct bond, adjacent to the N$^+$ of formula (I) or the N of formula (II). Furthermore, —O—, —S—, —CONH—, and —NHCO— groups cannot be attached directly to the N$^+$ of formula (I) and are not attached directly to the N of formula (II). In addition to optional branching (which, in effect, corresponds to alkyl substitution of a linear chain), the $C_8$–$C_{30}$ aliphatic groups (including any —CH=CH— and $C_5$–$C_7$ cycloalkylene) can be substituted with groups such as $C_1$–$C_6$ alkoxy, halogen (especially fluorine in —CF$_2$- groups), hydroxy, oxo (i.e., as a keto oxygen), ($C_1$–$C_6$ alkoxy)carbonyl, ($C_6$–$C_{10}$ aryloxy)carbonyl, and cyano. Suitable $C_8$–$C_{30}$ aliphatic groups include alkyl groups such as octyl, decyl, undecyl, lauryl (i.e., dodecyl), myristyl (i.e., tetradecyl), cetyl (i.e., hexadecyl), stearyl (i.e., octadecyl), eicosanyl, and docosanyl, as well as isomeric forms thereof; corresponding alkenyl, alkadienyl, and alkatrienyl groups such as 8-heptadecenyl or 9-octadecenyl (as its oleyl Z-isomer or elaidyl E-isomer); amidoalkyl groups such as cocamidoalkyl (i.e., coconut fatty acid amides of aminoalkyl groups, particularly cocamidopropyl) and ricinoleamidoalkyl (particularly ricinoleamidopropyl); and polyethers such as polyalkylenoxyalkyl (particularly polyethylenoxyethyl or polypropylenoxypropyl). Particularly preferred $C_8$–$C_{30}$ aliphatic groups include cocamidopropyl, lauryl, stearyl, 8-heptadecenyl, and oleyl. It is also possible, although not preferred, to replace some or all of the main-chain carbon atoms of group $R^1$ with —OSi($C_1$–$C_4$ alkyl)$_2$- groups, which means that the term "$C_8$–$C_{30}$ aliphatic" as used herein also includes polysiloxane groups in which silicon and oxygen atoms are not attached directly to the nitrogen atom of compounds of formulas (I) and (II) but are instead attached through one or more intervening carbon atoms.

The term "difunctional $C_1$–$C_8$ (cyclo)aliphatic" as used herein with respect to the definition of Y in the surfactants of component (1) refers to straight or branched chain difunctional aliphatic hydrocarbon groups having from 1 to 8 carbon atoms and to cyclic hydrocarbon groups having 5 to 8 ring carbon atoms, as well as to difunctional $C_5$–$C_7$ cycloaliphatic groups that can be attached to either or both of group Z and the nitrogen atom of compounds of formulas (I) and (II) through methylene, ethylene, or propylene groups, provided that the total number of main-chain and ring carbon atoms does not exceed eight. Examples of difunctional $C_1$–$C_8$ (cyclo)aliphatic groups are $C_1$–$C_8$ alkylene, such as propylene, butylene, pentylene, hexylene, heptylene, and octylene (and alkyl-substituted derivatives up to a total of eight carbon atoms), and $C_5$–$C_8$ cycloalkylene, such as 1,2- and 1,3-cyclopentylene, 1,2-, 1,3-, and 1,4-cyclohexylene, and 1,2-, 1,3-, and 1,4-cycloheptylene. Carbon-carbon double bonds can also be present in the chain as long as they are not adjacent to the N$^+$ and N of formulas (I) and (II), respectively, or to OH. Although generally not preferred, it is also possible to replace one or more carbon atoms in the aliphatic chain and/or cycloaliphatic ring with heteroatoms such as N (e.g., as NH or N-alkyl), 0, or S as long as such heteroatoms are not located adjacent to each other or to the N$^+$ and Z (and optional Z') of formula (I) or the N and Z' of formula (II). Preferred difunctional (cyclo) aliphatic groups are $C_1$–$C_6$ alkylene groups, especially methylene and ethylene groups.

The term "$C_1$–$C_6$ alkyl" as used herein refers to straight or branched chain aliphatic hydrocarbon groups having from 1 to 6 carbon atoms, also referred to as lower alkyl. Examples of $C_1$–$C_6$ alkyl are methyl, ethyl, propyl, butyl, pentyl, hexyl, and the isomeric forms thereof. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "($C_1$–$C_6$ alkoxy) carbonyl" refers to straight or branched chain alkoxycarbonyl groups having from 1 to 6 carbon atoms in the alkoxy portion. Examples of ($C_1$–$C_6$ alkoxy)carbonyl are methoxycarbonyl, ethoxycarbonyl, propoxycarbonyl, butoxycarbonyl, pentyloxycarbonyl, hexyloxycarbonyl, and the isomeric forms thereof. The term "($C_6$–$C_{10}$ aryloxy) carbonyl" refers to phenoxycarbonyl and 1- or 2-naphthoxycarbonyl, in which the aryl portion can optionally be further substituted with halogen, alkyl, alkoxy, alkoxycarbonyl, or nitro. Examples of halogen are fluorine, chlorine, bromine, and iodine.

Surfactants of formulas (I) and (II) that contain cations include compounds of formula (I) in which Z is —PO$_3^=$·1/n M$^{n+}$ and/or in which $R^2$ is —Y—COO$^-$·1/n M$^{n+}$, —Y—SO$_3^-$·1/n M$^{n+}$, or —Y—PO$_3^=$·2/n M$^{n+}$ and compounds of formula (II) in which Z is —COO$^-$·1/n M$^{n+}$, —SO$_3^-$·1/n M$^{n+}$, or —PO$_3^=$·2/n M$^{n+}$ and/or in which $R^2$ is —Y—COO$^-$·1/n M$^{n+}$, —Y—SO$_3^-$·1/n M$^{n+}$, or —Y—PO$_3^=$·2/n M$^{n+}$, where M$^{n+}$ in each case is a hydrogen ion and/or an n-valent cation. Suitable cations include metal ions, such as alkali metal ions (e.g., lithium, sodium, or potassium ions), alkaline earth ions (e.g., magnesium or calcium ions), aluminum ions, and ammonium ions such as $R^aR^bR^cR^dN^+$ (in which $R^a$, $R^b$, $R^c$, and $R^d$ independently are hydrogen, $C_1$–$C_6$ alkyl, $C_1$–$C_6$ hydroxyalkyl, $C_7$–$C_{16}$ aralkyl, and the like, such as NH$_4^+$).

Surfactants of formula (I) and formula (II) that do not contain heterocyclic rings formed by X and $R^2$ taken together are generally more preferred than those containing heterocyclic rings.

Preferred non-cyclic ionic surfactants of formula (I) are those in which $R^1$ is $C_8$–$C_{30}$ aliphatic or modified $C_8$–$C_{30}$ aliphatic in which at least one carbon atom in the main chain is replaced with —O—, —CONH—, —NHCO—, or —CH=CH—; $R^2$ and $R^3$ are independently hydrogen or $C_1$–$C_6$ alkyl (preferably an alkyl group such as methyl); X is a direct bond or —NHC(=NH)—; Y is $C_1$–$C_6$ alkylene (preferably methylene or ethylene); and Z is —COO$^-$, —SO$_3^-$, or OH, with the proviso that if Z is OH, then a stoichiometric amount of an anionic counterion (for example, a halide such as chloride, sulfate, bisulfate, phosphate, hydrogen phosphate or an ester thereof, dihydrogen phosphate or an ester thereof, nitrate, carbonate, or bicarbonate) must be present. Particularly preferred surfactants of formula (I) are amphoteric compounds in which Z is an anionic —COO$^-$ or —SO$_3^-$ group. Especially preferred surfactants of formula (I) are cocamidopropyl betaine, an amphoteric compound in which $R^1$ is cocamidopropyl, $R^2$ and $R^3$ are methyl, X is a direct bond, Y is methylene, and Z is —COO$^-$), and N-[3-(cocamido)propyl]-N-(2-hydroxy-3-sulfopropyl)—N,N-dimethylbetaine, an amphoteric compound in which $R^1$ is cocamidopropyl, $R^2$ and $R^3$ are methyl, X is a direct bond, Y is 2-hydroxypropyl, and Z is —SO$_3^-$.

Preferred non-cyclic surfactants of formula (II) are those in which $R^1$ is $C_8$–$C_{30}$ aliphatic or modified $C_8$–$C_{30}$ aliphatic in which at least one carbon atom in the main chain is replaced with —O—, —CONH—, —NHCO—, or —CH=CH—; $R^2$ is hydrogen, $C_1$–$C_6$ alkyl, or carboxyalkyl (preferably hydrogen, methyl, or carboxyethyl); X is a direct bond or —NHC(=NH)—; Y is $C_1$–$C_6$ alkylene (preferably methylene or ethylene); and Z' is —COO$^-$M$^+$or —SO$_3^-$M$^+$ (where M$^+$ is a hydrogen ion or an alkali metal ion) or OH. Particularly preferred surfactants of formula (II) are compounds in which Z' is —COO$^-$M$^+$ or —SO$_3^-$M$^+$ (where M$^+$ is a hydrogen ion and/or an alkali metal ion). An especially preferred surfactant of formula (II) is N-lauryl-β-iminodipropionic acid sodium salt, a compound in which $R^1$ is lauryl, $R^2$ is carboxyethyl, X is a direct bond, Y is ethylene, and Z is —COO$^-$Na$^+$. Also suitable are mixtures of octadecylguanidine polyoxyethanol (a compound of formula (II) in which $R^1$ is octadecyl, $R^2$ is hydrogen, X is —NHC(=NH)—, —YZ is —(CH$_2$CH$_2$O)$_x$—H (i.e., hydroxy-terminated alkylene containing oxygen heteroatoms)) and its manufacturing by-product octadecylamine polyoxyethanol (a compound of formula (II) in which $R^1$ is octadecyl, $R^2$ is hydrogen, X is a direct bond, —YZ is —(CH$_2$CH$_2$O)$_x$—H).

Cyclic surfactants of formulas (I) and (II), in which X and $R^2$ together with the N$^+$ (i.e., in formula (I)) or the N (i.e., in formula (II)) form five- to seven-membered rings, are heterocyclic compounds containing at least the one ring nitrogen atom shown in the formulas. Group X of such heterocyclic compounds are not direct bonds but must always contain at least one atom such that group $R^1$ is not connected directly to the nitrogen atom shown in formulas (I) and (II), respectively. Group X can contain more than one such atom as long as the resultant heterocyclic ring contains no more than seven ring atoms. For example, group X can be groups having the formulas

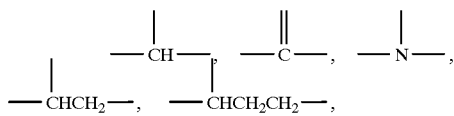

and the like, thereby forming heterocyclic rings that can be represented by the following formulas for surfactants of formula (I)

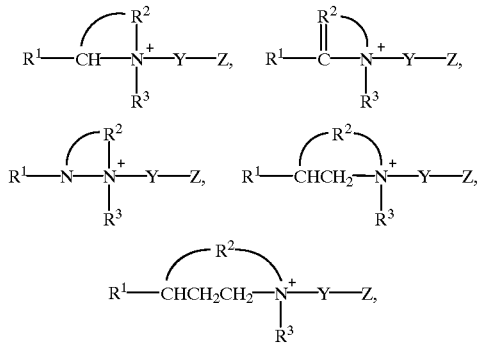

and the like (wherein $R^1$, $R^3$, Y, and Z are defined as above and $R^2$ completes a five- to seven-membered ring), and the following formulas for surfactants of formula (II)

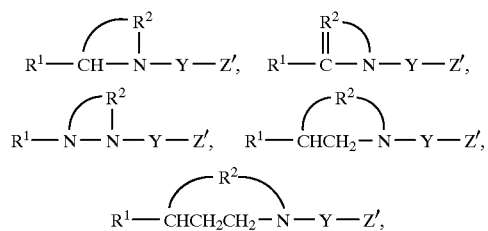

and the like (wherein $R^1$, Y, and Z' are defined as above and $R^2$ completes a five- to seven-membered ring). The heterocyclic moiety can be unsaturated, including being an aromatic ring as long as group Y is not attached to an aromatic quaternary ring nitrogen. The heterocyclic moiety can also contain additional heteroatoms such as N, O, or S in place of one or more ring carbon atoms, preferably such that no two heteroatoms are directly bonded to each other. Heterocyclic ring systems that can be incorporated into surfactants of formulas (I) and (II) include imidazolines, imidazoles, oxazolidines, oxazolines, and oxazoles. Preferred heterocyclic ring systems are imidazolines in which group $R^1$ is attached to the C-2 ring carbon atom and Y is attached to one of the ring nitrogen atoms. Particularly preferred surfactants containing such heterocyclic moieties are 2-(8-heptadecenyl)-2-imidazoline-1-ethanol, a compound of formula (II) in which X and $R^2$ together form an imidazoline moiety, $R^1$ is 8-heptadecenyl, Y is ethylene, and Z is OH and which is represented by the following formula

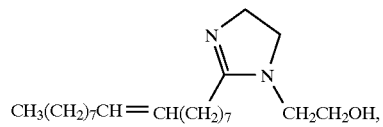

and 4,5-dihydro-1-(hydroxyethyl)-1(or 3)-(2-hydroxy-3-sulfopropyl)-2-norcocoalkylimidazolinium inner salt, an amphoteric compound within the scope of formula (I) and represented by one or both of the following formulas

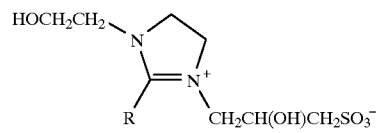

and/or

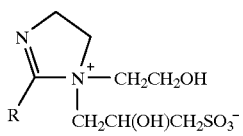

where R represents norcocoalkyl.

Mixtures of the surfactants described above are, of course, also suitable.

It is also possible to include as additional components in step (a) surfactants outside the definition of formulas (I) and (II), as well as other conventional additives. Examples of suitable such additives include long-chain fatty acids, such as stearic acid or behenic acid, or corresponding amides, esters, or salts, such as magnesium stearate, zinc stearate, aluminum stearate, or magnesium behenate; resin acids, such as abietic acid, rosin soap, hydrogenated or dimerized rosin; $C_{12}$–$C_{18}$-paraffin-disulfonic acids; sulfonated dicarboxylic acids or corresponding esters or amides thereof, such as sulfosuccinates, sulfosuccinamates, and derivatives thereof; alkyl phosphates and phosphonates; amines, such as laurylamine or stearylamine; polyamines, such as polyethylenimines; quaternary ammonium compounds, such as tri[($C_1$–$C_4$ alkyl)benzyl]-ammonium salts; alkylphenols; alcohols and diols, such as stearyl alcohol and dodecane-1, 2-diol; alkoxylated fatty acids and amides, alkoxylated alcohols, alkoxylated alkylphenols, and glycol esters; waxes, such as polyethylene wax; and plasticizers, such as epoxidized soya bean oil. Such additives can be incorporated in amounts ranging from about 0.1 to 20% by weight (preferably 0.1 to 5% by weight), based on the amount of the surfactants according to the invention. Conventional additives can themselves sometimes improve pigment dispersibility. However, even when such additives are included, pigments conditioned with the surfactants of formula (I) and (II) according to the invention exhibit improved dispersibilities relative to pigments that are not treated with surfactants according to the invention.

Conditioning step (a) is carried in a liquid (2) in which the organic pigment is substantially insoluble, preferably water, a water-soluble (including partly water-soluble) organic liquid, or mixtures thereof. Suitable liquids include water and mixtures of water and lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred. In general, at least 0.1% by weight (preferably 0.1 to 100% by weight (that is, a one-to-one weight ratio) and more preferably 2 to 15% by weight) of the surfactant, relative to the organic pigment, is used.

The temperature for step (a) should be maintained between about 50° C. and about 200° C., preferably between 70° C. and 150° C.

The conditioned organic pigment can optionally be surface treated in step (b), either in situ or after being isolated, by mixing the conditioned organic pigment with a suitable surface treatment additive in a liquid (such as those described above) in which the organic pigment is substantially insoluble. Suitable additives include the additives described above for use in conjunction with the surfactants of the invention.

The conditioned and optionally surface-treated organic pigment is collected in step (c) by methods known in the art but is preferably collected by filtration followed by washing to remove residual salts and solvent. Other collection methods known in the art, such as centrifugation or even simple decantation, are suitable but generally less preferred. The pigment is then dried for use or for further manipulation before use.

The pigments of this invention give a very good tinctorial yield and are readily dispersible (for example, in plastic materials). Because of their light stability and migration properties, the pigments according to the present invention are suitable for many different pigment applications.

The pigments of the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form, including molded articles, films, and fibers.

The pigments of the present invention are also suitable for pigmented mixtures with other materials, pigment formulations, coating compositions and paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of coating compositions and paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages and parts are percentages by weight and parts by weight, respectively.

EXAMPLES

Pigment dispersibilities in polyvinyl chloride ("PVC") were evaluated by comparing hot-milled and cold-milled color development according to the following procedure. For each sample tested, a mixture of 48.95 g of flexible PVC and 1.0 g of a 50% titanium dioxide paste was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. The reflectances of corresponding hot-milled and cold-milled samples were determined using a Datacolor CS-5 spectrophotometer and converted to K/S values according to the Kubelka-Munk equation. Dispersibilities were calculated by comparing the K/S value of each hot-milled sample with the K/S value of the corresponding cold-milled samples (which are assumed to have reached 100% dispersion and maximum K/S values). In general, dispersibilities were considered excellent for values of 80 to 100%, good for values of 60 to less than 80%, fair if 40 to less than 60%, poor if 20 to less than 40%, and very poor if less than 20%.

Examples 1–11 Treatment of dimethylperylene pigment

Examples 1–5 and 9 describe the conditioning of crude dimethyl perylenediimide presscake (Pigment Red 179) according to the invention. Examples 1–5 (but not Example 9) also included sodium dioctyl sulfosuccinate and aliphatic naphtha during conditioning. Comparison Example 6 was carried out by the same general method as used for Example 2 except for omitting the cocamidopropyl betaine surfactant. Comparison Examples 7, 8, 10, and 11 were carried out by the same general method as used for Example 1 except for using surfactants not according to the invention.

Example 1

Crude dimethyl perylenediimide presscake (86.1 g, corresponding to 26.0 g of 100% strength pigment) was slurried in a mixture of 111 g of methanol, 192.9 g of water, 2.6 g of 50% sodium hydroxide, and 7.4 g of 35% cocamidopropyl betaine. The resultant slurry was heated to 135° C. for four hours in a laboratory Parr reactor, then cooled to 45° C. and diluted to 700 ml with water. An aqueous emulsion containing 0.08 g of sodium dioctyl sulfosuccinate and 0.8 g of aliphatic naphtha was added and the slurry was held at 45° C. for three hours. The solid component was collected by filtration, washed, dried, and pulverized to a powder having excellent dispersibility in PVC. Test results are shown in Table 1.

Example 2

Crude dimethyl perylenediimide presscake (86.1 g, corresponding to 26.0 g of 100% strength pigment) was slurried in a mixture of 303.9 g of water, 2.6 g 50% sodium hydroxide, and 7.4 g of 35% cocamidopropyl betaine. The resultant slurry was heated at 145° C. for four hours, then cooled and diluted to 700 ml with water. An aqueous emulsion containing 0.08 g of sodium dioctyl sulfosuccinate and 0.8 g of aliphatic naphtha was added and the slurry heated at 45° C. for three hours. The solid component was collected by filtration, washed with water, dried, and pulverized to a powder having excellent dispersibility in PVC. Test results are shown in Table 1.

Example 3

A pigment was prepared in the same manner as Example 1 except that N-[3-(cocamido)propyl]-N-(2-hydroxy-3-sulfopropyl)-N,N-dimethyl-betaine was used instead of cocamidopropyl betaine. The resultant pigment exhibited excellent dispersibility in PVC. Test results are shown in Table 1.

Example 4

A pigment was prepared in the same manner as Example 1 except that 2-(8-heptadecenyl)-2-imidazoline-1-ethanol was used instead of cocamidopropyl betaine. The resultant pigment exhibited excellent dispersibility in PVC. Test results are shown in Table 1.

Example 5

A pigment was prepared in the same manner as Example 1 except that 4,5-dihydro-1-(hydroxyethyl)-1(or 3)-(2-hydroxy-3-sulfopropyl)-2-nor-cocoalkylimidazolinium inner salt was used instead of cocamidopropyl betaine. The resultant pigment exhibited excellent dispersibility in PVC. Test results are shown in Table 1.

Example 6 (Comparison)

Crude dimethyl perylenediimide (86.1 g, corresponding to 26.0 g of 100% strength pigment) was slurried in a mixture of 296.1 g of methanol, 15.2 g of water, and 2.6 g of 50% sodium hydroxide. The resultant slurry was heated at 120° C. for four hours, then cooled and diluted to 700 ml with water. An aqueous emulsion containing 0.8 g of sodium dioctyl sulfosuccinate and 13.0 g of aliphatic naphtha was added and the slurry heated at 45° C. for three hours. The solid component was collected by filtration, washed, dried, and pulverized to a powder having poor dispersibility in PVC. Test results are shown in Table 1.

Example 7 (Comparison)

A comparison pigment was prepared in the same manner as Example 1 except that the non-ionic surfactant Tergitol 15-5-9 (not according to the invention) was used instead of cocamidopropyl betaine. The resultant pigment exhibited good dispersibility in PVC but was inferior to the pigment of Example 1 of the invention. Test results are shown in Table 1.

Example 8 (Comparison)

A comparison pigment was prepared in the same manner as Example 1 except that the anionic surfactant Dyasulf C-70 (not according to the invention) was used instead of cocamidopropyl betaine. The resultant pigment exhibited good dispersibility in PVC but was inferior to the pigment of Example 1 of the invention. Test results are shown in Table 1.

Example 9

Crude dimethyl perylenediimide (86.1 g, corresponding to 26.0 g of 100% strength pigment) was slurried in a mixture of 111.0 g of methanol, 192.9 g of water, and 2.6 g of 50% sodium hydroxide containing 7.4 g of 35% cocamidopropyl betaine. The resultant slurry was heated at 135° C. for four hours, then cooled and diluted to 700 ml with water. The solid component was collected by filtration, washed with water, dried and pulverized to a powder having good dispersibility in PVC. Test results are shown in Table 1.

Example 10 (Comparison)

A comparison pigment was prepared in the same manner as Example 9 except that the non-ionic surfactant used in comparison Example 7 was used instead of cocamidopropyl betaine. The resultant pigment exhibited fair dispersibility in PVC but was inferior to the pigment of Example 9 of the invention. Test results are shown in Table 1.

Example 11 (Comparison)

A comparison pigment was prepared in the same manner as Example 9 except that the anionic surfactant used in comparison Example 8 was used instead of cocamidopropyl betaine. The resultant pigment exhibited fair dispersibility in PVC but was inferior to the pigment of Example 9 of the invention. Test results are shown in Table 1.

TABLE 1

Dispersibilities in PVC for Examples 1–11

| Example | Dispersibility in PVC Calculated (%) | Rating |
|---|---|---|
| 1* | 83.5% | Excellent |
| 2* | 81.9% | Excellent |
| 3* | 81.7% | Excellent |
| 4* | 81.1% | Excellent |
| 5* | 82.1% | Excellent |
| 6* (comp) | 34.5% | Poor |
| 7* (comp) | 69.8% | Good |
| 8* (comp) | 69.6% | Good |
| 9 | 71.0% | Good |
| 10 (comp) | 56.6% | Fair |
| 11 (comp) | 55.5% | Fair |

*Sodium dioctyl sulfosuccinate and aliphatic naphtha included during conditioning Examples 1–11 show that conditioning perylene pigments in the presence of surfactants according to the invention (i.e., Examples 1–5 and 9) provides more highly dispersible pigments than untreated pigments (i.e., Example 6) or pigments conditioned with non-ionic and anionic surfactants not according to the invention (i.e., Examples 7, 8, 10, and 11). Although conditioning in the presence of sodium dioctyl sulfosuccinate and aliphatic naphtha provided pigments having improved dispersibility relative to untreated pigments, the corresponding pigments conditioned according to the invention were always superior.

Examples 12–14 Treatment of perylene pigment

Example 12 describes the conditioning of crude perylenediimide presscake (Pigment Violet 29) according to the invention. Comparison Example 13 was carried out by the same method as used for Example 12 except for omitting the N-lauryl-β-iminodipropionic acid sodium salt. Comparison Example 14 was carried out by the same method as used for Example 12 except for omitting the N-lauryl-β-iminodipropionic acid sodium salt and the mixture of sodium dioctyl sulfosuccinate and aliphatic naphtha during conditioning.

Example 12

Crude perylenediimide presscake (83.9 g, corresponding to 26.0 g of 100% strength pigment) was slurried in a mixture of 185.1 g of methanol, 119.7 g of water, 2.6 g of 50% sodium hydroxide, and 8.7 g of 30% N-lauryl-β-iminodipropionic acid sodium salt. The resultant slurry was heated at 125° C. for six hours in a laboratory Parr reactor, then cooled and diluted to 700 ml with water. An aqueous emulsion containing 0.9 g of sodium dioctyl sulfosuccinate and 13.0 g of aliphatic naphtha was added and the slurry heated at 45° C. for three hours. The solid component was collected by filtration, washed with water, oven dried, and pulverized to a powder having good dispersibility in PVC. Test results are shown in Table 2.

Example 13 (comparison)

A comparison pigment was prepared in the same manner as Example 12 except that the N-lauryl-β-iminodipropionic acid sodium salt was omitted. The resultant pigment exhibited very poor dispersibility in PVC. Test results are shown in Table 2.

Example 14 (comparison)

A comparison pigment was prepared in the same manner as Example 12 except that the N-lauryl-β-iminodipropionic acid sodium salt and the mixture of sodium dioctyl sulfosuccinate and aliphatic naphtha were omitted. The resultant pigment exhibited very poor dispersibility in PVC. Test results are shown in Table 2.

TABLE 2

Dispersibilities in PVC for Examples 12–14

| Example | Dispersibility in PVC Calculated (%) | Rating |
|---|---|---|
| 12* | 78.8% | Good |
| 13* (comp) | 18.2% | Very poor |
| 14 (comp) | 12.8% | Very poor |

*Sodium dioctyl sulfosuccinate and aliphatic naphtha included during conditioning Examples 12–14 show that conditioning perylene pigments in the presence of N-lauryl-β-iminodipropionic acid sodium salt according to the invention provides a highly dispersible pigment when compared to the untreated pigment or to pigment treated only with a mixture of sodium dioctyl sulfosuccinate and aliphatic naphtha.

Examples 15–16 Treatment of an indanthrone pigment

Example 15 describes the conditioning of crude indanthrone (Pigment Blue 60 or Vat Blue 4; obtained as Indanthrene Blue RSN (CDP) from Sunbelt Corporation) according to the invention. Comparison Example 16 was carried out by the same method except for omitting the cocamidopropyl betaine surfactant.

Example 15

100 parts of indanthrone were introduced into a ball mill containing 3000 parts of steel balls as grinding elements. The capacity of the ball mill was such that it was 60% full when completely charged. The mill was rotated for 48 hours, after which the powder was discharged through a screen that retained the grinding elements. The milled powder was added to water (four times the weight of the pigment) and stirred until thoroughly wet. The wetted powder was treated with methyl benzoate (80% by weight of pigment powder), then heated at 140° C. for eight hours. After the mixture was cooled, the methyl benzoate was hydrolyzed using 50% aqueous sodium hydroxide at 90° C. for 2 hours. After the hydrolyzed mixture was cooled, cocamidopropyl betaine (10% of the weight of pigment) was added and the mixture was heated at 140° C. for four hours. After cooling, the solid component was collected by filtration, filtered, washed with water, and dried to give a conditioned pigment having excellent dispersibility in PVC. Test results are shown in Table 3.

Example 16 (Comparison)

A comparison pigment was prepared in the same manner as Example 15 except that the cocamidopropyl betaine was omitted. The resultant pigment exhibited good dispersibility in PVC. Test results are shown in Table 3.

TABLE 3

Dispersibilities in PVC for Examples 15 and 16

| Example | Dispersibility in PVC Calculated (%) | Rating |
|---|---|---|
| 15 | 80.7% | Excellent |
| 16 (comp) | 62.7% | Good |

Examples 15 and 16 show that the dispersibility of indanthrone was improved by conditioning in the presence of cocamidopropyl betaine according to the invention.

Examples 17–18 Treatment of a copper phthalocyanine pigment

Example 17 describes the conditioning of a mixture of copper phthalocyanines containing 70% by weight of chlorine-free copper phthalocyanine and 30% by weight of monochlorinated copper phthalocyanine according to the invention. Comparison Example 18 was carried out by the same method except for omitting the surfactant.

Example 17

Example 15 was repeated except for replacing the indanthrone with a mixture of 70% by weight chlorine-free copper phthalocyanine (obtained from Toyo Ink Inc.) and 30% by weight monochlorinated copper phthalocyanine (obtained from Sanyo Color Works). The resultant pigment having good dispersibility in PVC. Test results are shown in Table 4.

Example 18 (Comparison)

A comparison pigment was prepared in the same manner as Example 17 except that the cocamidopropyl betaine was omitted. The resultant pigment exhibited fair dispersibility in PVC. Test results are shown in Table 4.

TABLE 4

Dispersibilities in PVC for Examples 17 and 18

| Example | Dispersibility in PVC Calculated (%) | Rating |
|---|---|---|
| 17 | 63.2% | Good |
| 18 (comp) | 47.7% | Fair |

Examples 17 and 18 show that the dispersibility of chlorinated copper phthalocyanine pigments was improved by conditioning in the presence of cocamidopropyl betaine according to the invention.

Examples 19–22 Treatment of an isoindoline pigment

Examples 19 and 21 describe the conditioning of crude Pigment Yellow 139 (an isoindoline pigment) according to the invention. Example 21 also included sodium dioctyl sulfosuccinate and aliphatic naphtha during conditioning. Comparison Examples 20 and 22 were carried out by the same general method as used for Examples 19 and 21, respectively, except for omitting the cocamidopropyl betaine surfactant.

Example 19

Crude Pigment Yellow 139 presscake (55.75 g, corresponding to 20 g of 100% strength pigment) was slurried in 300 g of water. When the mixture had become uniform, 5.7 g of cocamidopropyl betaine was added and the pH was adjusted to 6.0. The mixture was heated at 130° C. for two hours in a laboratory Parr reactor, then cooled to room temperature. The solid component was collected by filtration and washed with water. The wet presscake was dried in the oven at 60° C. overnight to yield 20.0 g of a yellow pigment exhibiting soft texture with fair dispersibility in PVC. Test results are shown in Table 5.

Example 20 (Comparison)

A comparison pigment was prepared in the same manner as Example 19 except that the cocamidopropyl betaine was omitted. The resultant pigment exhibited poor dispersibility in PVC. Test results are shown in Table 5.

Example 21

Example 19 was repeated except that the cooled mixture from the Parr reactor was treated with an aqueous emulsion of 0.6 g of sodium dioctyl sulfosuccinate, 10.0 g of aliphatic naphtha, and 40.0 g of water and the resultant mixture was stirred at 45° C. for 3 hours, after which the resultant slurry was filtered and washed with water. The wet presscake was dried in an oven at 60° C. overnight to yield 20.0 g of a yellow pigment exhibiting soft texture with excellent dispersibility in PVC. Test results are shown in Table 5.

Example 22 (Comparison)

A comparison pigment was prepared in the same manner as Example 21 except that the cocamidopropyl betaine was omitted. The resultant pigment exhibited good dispersibility in PVC. Test results are shown in Table 5.

TABLE 5

Dispersibilities in PVC for Examples 19–22

| Example | Dispersibility in PVC Calculated (%) | Rating |
|---|---|---|
| 19 | 56.2% | Fair |
| 20 (comp) | 31.5% | Poor |
| 21* | 88.7% | Excellent |
| 22* (comp) | 64.2% | Good |

*Sodium dioctyl sulfosuccinate and aliphatic naphtha included during conditioning.

Examples 19–22 show that conditioning isoindoline pigments in the presence of cocamidopropyl betaine according to the invention provides more highly dispersible pigments than untreated pigments. Although conditioning in the presence of a mixture of sodium dioctyl sulfosuccinate and aliphatic naphtha provided pigments having improved dispersibility relative to untreated pigments, the pigments conditioned according to the invention were always superior to corresponding pigments that were not conditioned according to the invention. For example, although the pigment of Example 19 exhibited only fair dispersibility, the corresponding comparison pigment of Example 20 was inferior.

What is claimed is:

1. A process for preparing pigment compositions comprising
    (a) conditioning an organic pigment, at a temperature of about 50 to about 200° C., with a mixture consisting essentially of
        (1) at least about 0.1% by weight, relative to the organic pigment, of one or more surfactants comprising
            (i) an ionic surfactant of the formula

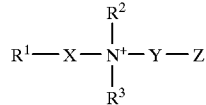

wherein
  $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, —OSi($C_1$–$C_4$ alkyl)$_2$-, or optionally substituted $C_5$–$C_7$ cycloalkylene,
  $R^2$ is hydrogen, $C_1$—$C_6$ alkyl, or —Y—Z',
  $R^3$ is hydrogen or $C_1$-$C_6$ alkyl, or $R^2$ and $R^3$ together are $C_4$-$C_7$ alkylene,
  X is a direct bond or —NHC(=NH)—, or X and $R^2$ taken together with the $N^+$ form a five- to seven-membered heterocyclic ring,
  Y is difunctional $C_1$–$C_8$ (cyclo)aliphatic,
  Z is —COO$^-$, —SO$_3^-$, —PO$_3^=$·1/n $M^{n+}$ (wherein $M^{n+}$ is a hydrogen ion or an n-valent cation), or OH, with the proviso that if Z is OH, then a anionic counterion must be present, and
  Z' is —COO$^-$·1/n $M^{n+}$, —SO$_3^-$·1/n $M^{n+}$, or —PO$_3^=$·2/n $M^{n+}$ (wherein $M^{n+}$ is a hydrogen ion and/or an n-valent cation) or OH, with the proviso that Z' must be OH if Z is OH;
        (ii) a surfactant of the formula

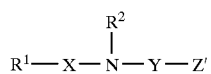

wherein
  $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, —OSi($C_1$–$C_4$ alkyl)$_2$-, or optionally substituted $C_5$–$C_7$ cycloalkylene,
  $R^2$ is hydrogen, $C_1$-$C_6$ alkyl, or —Y—Z',
  X is a direct bond or —NHC(=NH)—, or X and $R^2$ taken together with the N form a five- to seven-membered heterocyclic ring,
  Y is difunctional $C_1$–$C_8$ (cyclo)aliphatic, and
  Z' is —COO$^-$·1/n $M^{n+}$, —SO$_3^-$·1/n $M^{n+}$, or —PO$_3^=$·2/n $M^{n+}$ (wherein $M^{n+}$ is a hydrogen ion and/or an n-valent cation) or OH; and
        (iii) mixtures thereof;
    (2) about 1 to about 100 parts by weight, per part by weight of the organic pigment, of a liquid in which the organic pigment is substantially insoluble; and
    (3) optionally, about 0.1 to 20% by weight, based on the amount of surfactant (1), of one or more additives selected from the group consisting of long-chain fatty acids and corresponding amides, esters, and salts; resin acids; $C_{12}$–$C_{18}$-paraffin-disulfonic acids; sulfonated dicarboxylic acids and corresponding esters and amides; alkyl phosphates and phosphonates; laurylamine, stearylamine; polyamines; quaternary ammonium compounds; alkyl phenols; alcohols and diols; alkoxylated fatty acids and amides; alkoxylated alcohols; alkoxylated alkylphenols; glycol esters; waxes; and plasticizers, thereby forming a suspension of the conditioned organic pigment in the liquid;
    (b) optionally, surface treating the conditioned organic pigment; and
    (c) collecting the conditioned organic pigment.

2. A process according to claim 1 wherein the organic pigment is a perylene, phthalocyanine, indanthrone, isoindoline, or quinacridone.

3. A process according to claim 1 wherein surfactant (1) is a non-cyclic ionic surfactant of the formula

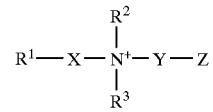

wherein
  $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —CONH—, —NHCO—, or —CH=CH—;
  $R^2$ and $R^3$ are independently hydrogen or $C_{1-C6}$ alkyl;
  X is a direct bond or —NHC(=NH)—;
  Y is $C_{1-C6}$ alkylene; and
  Z is —COO$^-$, —SO$_3^-$, or OH, with the proviso that if Z is OH, then a stoichiometric amount of an anionic counterion must be present.

4. A process according to claim 1 wherein surfactant (1) is cocamidopropyl betaine or N-[3-(cocamido)propyl]-N-(2-hydroxy-3-sulfopropyl)-N,N-dimethylbetaine.

5. A process according to claim 1 wherein surfactant (1) is a non-cyclic surfactant of the formula

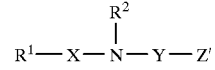

wherein
  $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —CONH—, —NHCO—, or —CH=CH—;
  $R^2$ is hydrogen, $C_1$–$C_6$ alkyl, or carboxyalkyl;
  X is a direct bond or —NHC(=NH)—;
  Y is $C_1$–$C_6$ alkylene; and
  Z' is —COO$^-M^+$ or —SO$_3^-M^+$ (where $M^+$ is hydrogen or an alkali metal ion), or OH.

6. A process according to claim 1 wherein surfactant (1) is N-lauryl-β-iminodipropionic acid sodium salt.

7. A process according to claim 1 wherein surfactant (1) is a cyclic surfactant of the formula

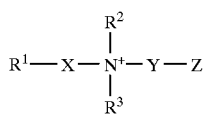

wherein $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —CONH—, —NHCO—, or —CH=CH—;

X and $R^2$ together with the $N^+$ form a five- to seven-membered ring;

Y is $C_1$–$C_6$ alkylene; and

Z' is —COO⁻, —SO$_3^-$, or OH.

8. A process according to claim 1 wherein surfactant (1) is 4,5-dihydro-1-(hydroxyethyl)-1(or 3)-(2-hydroxy-3-sulfopropyl)-2-norcoco-alkylimidazolinium inner salt.

9. A process according to claim 1 wherein surfactant (1) is a cyclic surfactant of the formula

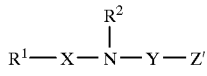

wherein $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —CONH—, —NHCO—, or —CH=CH—;

X and $R^2$ together with the N form a five- to seven-membered ring;

Y is $C_1$–$C_6$ alkylene; and

Z' is —COO⁻M⁺ or —SO$_3^-$M⁺ (where M⁺ is hydrogen or an alkali metal ion), or OH.

10. A process according to claim 1 wherein surfactant (1) is 2-(8-heptadecenyl)-2-imidazoline-1-ethanol.

11. A process according to claim 1 wherein 0.1 to 100% by weight, relative to the organic pigment, of surfactant (1) is used.

12. A process according to claim 1 wherein 6 to 12 parts by weight per part by weight of the organic pigment of liquid (2) is used in step (a).

13. A process according to Claim 1 wherein liquid (2) is water, a water-soluble organic liquid, or a mixture thereof.

14. A process according to claim 1 wherein the conditioned pigment is treated with a surface treatment additive.

15. A process according to claim 1 wherein the conditioned pigment is collected by filtration.

16. A pigment composition prepared according to the process of claim 1.

17. A pigmented macromolecular substance containing as pigment a pigment composition prepared according to the process of claim 1.

18. A pigmented coating composition containing as pigment a pigment composition prepared according to claim 1.

19. A pigmented printing ink containing as pigment a pigment composition prepared according to claim 1.

* * * * *